(12) United States Patent
Schuppert et al.

(10) Patent No.: US 7,424,465 B2
(45) Date of Patent: Sep. 9, 2008

(54) METHOD AND COMPUTER FOR EXPERIMENTAL DESIGN

(75) Inventors: Andreas Schuppert, Kürten (DE); Arne Ohrenberg, Bergisch Gladbach (DE)

(73) Assignee: Bayer Technology Services GmbH, Leverkusen (DE)

( * ) Notice: Subject to any disclaimer, the term of this patent is extended or adjusted under 35 U.S.C. 154(b) by 194 days.

(21) Appl. No.: 10/511,231

(22) PCT Filed: Apr. 2, 2003

(86) PCT No.: PCT/EP03/03424

§ 371 (c)(1),
(2), (4) Date: Oct. 12, 2004

(87) PCT Pub. No.: WO03/087957

PCT Pub. Date: Oct. 23, 2003

(65) Prior Publication Data

US 2005/0197986 A1    Sep. 8, 2005

(30) Foreign Application Priority Data

Apr. 15, 2002 (DE) ................. 102 16 558

(51) Int. Cl.
*G06F 17/00* (2006.01)
*G06N 5/00* (2006.01)
(52) U.S. Cl. ............................. 706/45; 706/15; 706/19
(58) Field of Classification Search .................. 706/45, 706/48, 15, 19
See application file for complete search history.

(56) References Cited

U.S. PATENT DOCUMENTS

| | | | | |
|---|---|---|---|---|
| 5,253,331 A | * | 10/1993 | Lorenzen et al. | 706/45 |
| 5,621,665 A | | 4/1997 | Ghosh et al. | 364/552 |
| 6,009,379 A | | 12/1999 | Kurtzberg et al. | 702/84 |
| 6,044,212 A | * | 3/2000 | Flavin et al. | 703/6 |
| 6,144,885 A | * | 11/2000 | Scarrah | 700/28 |
| 6,144,897 A | * | 11/2000 | Selliers | 700/269 |
| 6,175,816 B1 | * | 1/2001 | Flavin et al. | 703/13 |
| 6,516,313 B1 | * | 2/2003 | Perry | 707/6 |
| 6,604,092 B1 | * | 8/2003 | Stewart | 706/47 |
| 6,684,161 B2 | * | 1/2004 | Cawse | 702/22 |

(Continued)

FOREIGN PATENT DOCUMENTS

WO    WO 00/15341    3/2000

(Continued)

OTHER PUBLICATIONS

D. Wolf et al., *An Evolutionary Approach in the Combinatorial Selection and Optimization of Catalytic Materials*, Applied Catalysis A General 200 [2000] 63-77.

(Continued)

*Primary Examiner*—Joseph P. Hirl
*Assistant Examiner*—Adrian L Kennedy
(74) *Attorney, Agent, or Firm*—Christa Hildebrand; Norris McLaughlin & Marcus, PA

(57) ABSTRACT

Method and system for designing experiments by selecting at least a first experiment from an experimental space using a data-driven optimizer, receiving experimentally determined data, evaluating the experimentally determined data at a mata layer module, processing the experimentally determined data at the optimizer; the processing at the optimizer being influenced by the evaluation data.

23 Claims, 5 Drawing Sheets

U.S. PATENT DOCUMENTS

| | | | |
|---|---|---|---|
| 6,728,641 B1 * | 4/2004 | Cawse | 702/19 |
| 6,763,276 B1 * | 7/2004 | Perry | 700/97 |
| 6,826,487 B1 * | 11/2004 | Cawse et al. | 702/19 |
| 6,983,233 B1 * | 1/2006 | Falcioni et al. | 703/12 |
| 6,996,550 B2 * | 2/2006 | Wang et al. | 706/19 |

FOREIGN PATENT DOCUMENTS

| WO | WO 00/43411 | 7/2000 |
|---|---|---|
| WO | WO 00/51045 | 8/2000 |

OTHER PUBLICATIONS

A.S. McLeod et al., *Heterogeneous Catalyst Design Using Stochastic Optimization Algorithms*, J. Chem. Inf. Comput. Sci. 2000, 40, 981-987.

* cited by examiner

METHOD AND COMPUTER FOR EXPERIMENTAL DESIGN

This is a 371 of PCT/EP2003/003424 filed 2 Jul. 2003 (international filing date).

FIELD OF THE INVENTION

The present invention relates generally to method and system for designing experiments using a computer, and more particularly, using a computer to design experiments where the processing performed by the computer to design experiments includes evaluation of experimental data and data filtering.

BACKGROUND OF THE INVENTION

In the prior art, it is known to design experiments using statistical experiment design methods. Such design methods are used, inter alia, to determine, with a minimum number of experiments, an empirical process model for the relationship between controlled variables and influencing variables in a process and for the resulting product properties and process properties. Such statistical experiment design methods can be performed, for example, using the "STAVEX" (STAtistical experiment designing with EXpert system, manufacturer AICOS Technologies, Switzerland) computer software program and software sold under the name "Statistica®" by StatSoft (Europe) GmbH, Germany.

Various, different prior art experiment design techniques exist in the field of statistical experiment design. All statistical experiment design methods originate from the classic, fully factorial method. The factorial method compares all of the quality-conditioned factors with one another by analogy with variance analysis. Over the course of the last few decades, numerous variants of the factorial method have been developed and validated in research and development laboratories.

Modern experiment design methods according to Taguchi or Shainin are distinguishable from the classic, fully factorial methods. The Shainin Design of Experiment ("DOE") method is a suitable optimization process because it isolates what are known as strong influencing variables and performs processing to determine their relevance and dependence. The Taguchi DOE is based on prior art fractional factorial, orthogonal experiment designs. As pre-selecting the most important influencing variables achieves drastic savings in terms of experiment runs necessary, the Tagauchi technique is a rapid and relatively economic method of designing experiments and processes.

Further known statistical experiment design techniques of the fractional factorial experiment design type include Plackett-Burmann experiment designs, central composite designs, Box-Behnken experiment designs, D-optimal designs, mixed designs, balanced block designs, Latin squares, and desperado designs (see e.g. Eberhard Scheffler, Statische Versuchsplanung und-Auswertung, Deutscher Verlag für Grundstoffindustrie, Stuttgart, 1997).

Additional methods for designing experiments are also known from Hans Bendemer, "Optimale Versuchsplanung" [Optimum experiment design], Reihe Deutsche Taschenbücher (DTB, Volume 23, and ISBN 3-87144-278-X) and Wilhem Kleppmann, Taschenbuch Versuchsplanung, "Produkte und Prozesse optimieren" [Optimize products and processes], 2nd expanded edition, ISBN: 3-446-21615-4. These methods are often used in practice for reasons of cost.

The disadvantage with known statistical methods for designing experiments is that the processing associated with experiment design and modelling is performed without accounting for additional knowledge. Consequently, under certain circumstances, no suitable optima are found and the reliability of the results and statements generated is questionable. A further significant disadvantage of prior art methods for designing experiments is that, where a large number of influencing variables need to be taken into account, the prior art methods become too extensive. In addition, with respect to certain experimental systems, for example in catalysis or active ingredient research, the target function is often heavily fractured and, therefore, is difficult to capture with statistical methods.

WO 00/15341, incorporated by reference herein, discloses a method for developing solid catalysts for heterogeneous catalysed reaction processes, which is based on parallelized testing according to evolutionary methods. Corresponding methods which operate in an evolutionary way are also known from WO 00/43411, J. chem. Inf. Compute. Sci. 2000, 40, 981 987 "Heterogeneous Catalyst Design Using Stochastic Optimization Algorithms" and from Applied Catalysis A: General 200 (2000) 63 77 "An evolutionary approach in the combinatorial selection and optimization of catalytic materials", each of which incorporated by reference herein.

In addition, U.S. Pat. No. 6,009,379, incorporated by reference herein, discloses a method for controlling a manufacturing process by means of an efficient experimental design. According to this patent, test points are distributed uniformly on a multidimensional spherical surface so that the individual manufacturing parameters can be weighted uniformly.

FIG. 1 shows a block diagram of a prior art system 20 for performing screening experiments, such as may be used in the fields of catalysis and material and active ingredient research. It is to be understood that each of the functional blocks of the system 20 described below as performing data processing operations, as well as functional blocks of the systems described below and shown in the drawings as constituting embodiments of the present invention, constitutes a software module or, alternatively, a hardware module or a combined hardware/software module. In addition, each of the modules suitably contains a memory storage area, such as RAM, for storage of data and instructions for performing processing operations. Alternatively, instructions for performing processing operations can be stored in hardware in one or more of the modules.

Referring to FIG. 1, the system 20 includes a substance library module 1, such as a combinatorial library module, coupled to an experiment set-up module 2. The module 2 is coupled to an experiment data module 3 and a data-driven optimizer 4. The optimizer 4 also is coupled to the library module 1. The module 2 performs high throughput screening ("HTS") or high speed experimentation ("HSE") experiments. Such screening experiments typically are used for identifying active ingredients, catalysis research (homogeneous and heterogeneous), materials research and identification of optimum reaction conditions in chemical, biochemical or biotechnical systems. The optimizer 4 is a black-box optimizer which operates based on a data-driven model or on an evolutionary algorithm. The optimizer 4 does not have a priori knowledge of the structure and interactions concerning experiment design. The optimizer 4, instead, is restricted to the evaluation of the experiment data for purposes of selecting experiments stored at the combinatorial library module 1. The black-box optimizer 4 is implemented, for example, by means of genetic algorithms, evolutionary algorithms or strategies, neural networks or other data-driven model approaches which rely on stochastic or deterministic optimization structures or optimization structures which are a combination of both the former and latter.

In operation, the experiment set-up module 2 usually performs processing on a plurality of experiments. The module 2 provides experimental results in the form of a data file to the experiment data module 3. At the same time, the module 2 provides the experimental result data, or at least a portion thereof, as input data to the data-driven optimizer 4. The experiment data in the module 3 includes influencing variables, such as attributes, factors, structure features, descriptors, physical variables and properties of materials, and data relating to the effect these variables have on target variables. The optimizer 4 in performing its processing typically uses the experiment data stored in the module 3 to define an optimum search direction within the space of the target variables.

A common disadvantage of systems similar to the prior art system 20 is that a priori information cannot have an influence, or can only have a restricted influence, in the black-box optimizer 4, such that search strategies often converge slowly or converge on unsuitable suboptima. Consequently, prior art methods often are inefficient in terms of the expenditure of time and financial outlay. In addition, where experiment design techniques are based on evolutionary algorithms, there is a risk that the expenditure and outlay is higher when the optimizer is used to reach the optimum than when a rational or statistical procedure is used.

Therefore, there exists a need for a method and system for designing experiments using a computer based system which improves convergence speed and ensure convergences at a suitable optimum while also increasing the reliability of the results.

SUMMARY OF THE INVENTION

In accordance with the present invention, method and system for designing experiments using a computer based system involves using knowledge associated with experimentation to influence processing at a data-driven optimizer. The knowledge includes a prior knowledge and supplementary knowledge obtained from continuously evaluating previously performed experiments.

In a preferred embodiment, a computer based system for designing experiments includes a meta layer module which uses a priori and supplementarily obtained knowledge to influence processing operations at an optimizer, thereby effectively tuning the optimizer. The knowledge preferably includes rules associated with interactions, such as rules relating to structure-interaction with data mining and other methods. The rules can be integrated in the processing the optimizer performs for designing experiments to influence the optimizer processing before, during or after an optimization processing step, or even continuously.

In a preferred embodiment, the meta layer module can perform processing corresponding to the processing models associated with a neural network, a hybrid model, a rigorous model and data mining methods. The data mining methods can include a decision tree method, a general separation method, a subgroup search method, a general partition method, a cluster method, an association rule generator and a correlation method.

In a preferred embodiment, the inventive method for designing experiments for achieving an optimization goal has the following steps: A) selection of at least a first experiment from an experimental space by means of a data-driven optimizer in a computer unit; B) inputting of experimentally determined experiment data of the first experiment in at least one meta layer into a computer unit; C) use of at least one meta layer for the evaluation of the experiment data; D) inputting of the experimentally determined experiment data of the first experiment into the data driven optimizer; E) influencing of the data driven optimizer by the result of the evaluation in the meta layer and checking the goal achieved; F) selection of at least a second experiment from the experimental space by means of the data-driven optimizer; G) repetition of steps B) to E) for the data of the second experiment; and H) stopping the method on achieving the goal or repeating steps A) to F) for at least a third or subsequent experiments until the goal has been achieved.

The method is repeated until the optimization goal has been achieved or until it is concluded that it may not be possible to achieve the optimization goal. The method can be terminated automatically or by the user. The optimization goal may be to reach certain evaluation characteristic numbers for the experiments. The characteristic numbers may, for example, be yield selectivities, space time yields, costs, physical properties, action mechanisms, derived properties, etc. It is also possible to evaluate the experiments using a plurality of characteristic numbers.

In a preferred embodiment, the processing at the optimizer is influenced by direct intervention with the processing operations performed by the optimizer, or indirectly by filtering the data which forms the basis for the optimization processing performed by the optimizer.

In another preferred embodiment, a method for influencing the optimizer tunes the optimizer and the optimization process. The tuning method can include, for example, a subgroup search method, correlation analysis and attribute statistics in the case of rule generators.

In a further preferred embodiment, the inventive system includes a plurality of meta layer modules, such that processing is improved in a preceding meta layer, intervention can occur in a preceding meta layer or layers and direct intervention can occur in the black-box optimization processing performed at the optimizer.

In still a further preferred embodiment of the invention, the intervention positions in the original optimization process and the methods or combinations of methods used in the meta layer(s) are varied in each optimization step. In addition selecting suitable methods for generating optimum rules can be performed automatically.

In another preferred embodiment, the optimizer is influenced by a re-evaluation of experiment data which already contains an evaluation. The experiment data can include an evaluation where appropriate experiment data, such as yield data, is determined directly by experimentation. The re-evaluation can be performed by filtering the yield data. The method of filtering utilized is based on rules or other relationships which are determined based on an analytical method of processing experiment data, for example, processing methods associated with neural networks and data mining methods. Data filtering further increases the weighting of particularly good yields and further reduces the weighting of particularly bad yields, thereby achieving a more rapid convergence of the experiment sequence.

In an alternative embodiment where the experiment data does not directly contain an experimentally determined evaluation, but rather the evaluation is determined only by calculations which follow the experiment, filtering or weighting is performed not on data which is determined experimentally but rather on evaluations which are determined by calculation.

In a further preferred embodiment, the optimizer processing is influenced by reducing, enlarging or displacing the experimental space.

In still a further preferred embodiment, the filtering can include pre-selecting and weighting of the experiment data. Particularly bad experiment data, in other words, experiment data recognized as unsuitable by, for example, a rule generator, is pre-selected and eliminated from the experimental space. In addition, if the rule generator determines that corresponding parameters are irrelevant, entire columns or rows can also be eliminated from an experiment data matrix, thereby reducing the experimental space and, in turn, considerably reducing the overall expenditure in terms of processing time.

The weighting of the experiment data can include duplicating particularly relevant experiment data a single time or repeatedly in the experiment data matrix. Alternatively, the weighting can include introducing a weighting coefficient.

In a further preferred embodiment of the invention, the optimizer includes at least one core operator module and a module for selecting new test points. The method of operation of the optimizer is then influenced by influencing at least one of the core modules and the module for selecting new test points based on relationships recognized by, for example, a rule generator.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

Figure 1:
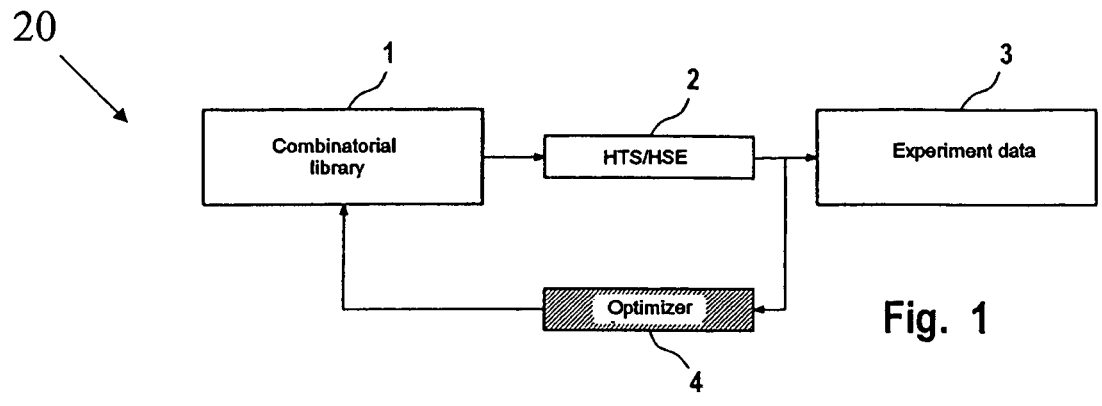
FIG. 1 is a block diagram of a prior art system for designing experiments.
Figure 2:
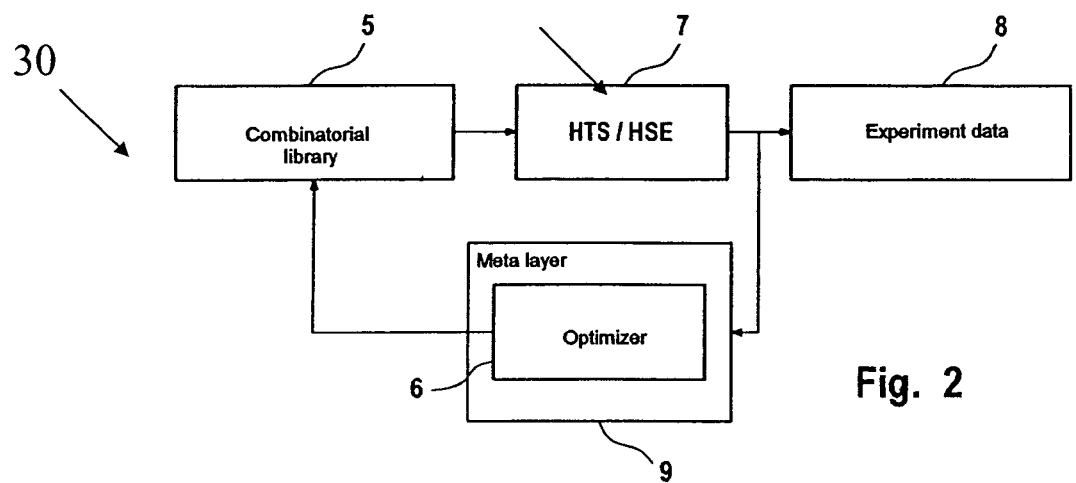
FIG. 2 is a block diagram of an embodiment of a system for designing experiments according to the present invention.

FIG. 2 shows in block diagram form an embodiment of a system 30 for designing experiments in accordance with the present invention. Like reference numerals are used herein to describe system components having substantially similar, and preferably identical, structure and operation as described previously.

Referring to FIG. 2, the system 20 includes a combinatorial library 5 which is formed based on the peripheral conditions corresponding to an experimental space. An experiment set-up module 7 is coupled to the library 5, an experiment data module 8 and a meta layer module 9. The module 9 includes an optimizer 6 and is coupled to the library 5. In operation, the optimizer 6 selects one or more experiments from the combinatorial library 5, which are then performed in the experiment set-up module 7, for example, by means of a high throughput screening or high speed experimentation experiment method. The experiment data generated at the module 7 is provided in the form of a data file to the experiment data module 8.

The meta layer module 9 influences processing at the optimizer 6 by taking into account a priori knowledge or knowledge acquired while the experiment is performed. In a preferred embodiment, the optimizer 6 continuously evaluates the data stored as data files in the module 8 to acquire knowledge in the form of rules or trained neural networks. The meta layer module 9, therefore, complements and influences processing at the optimizer 6 by providing additional knowledge to the optimizer 6, thereby hastening convergence of the experiment series.

The meta layer module 9 also permits improvement of the convergence speed of a black-box optimization method, which is implemented in the optimizer 6, by integrating prior knowledge and rule structures. This integration can be performed in various ways, such as by: A) information-supported additional selection of the test ensembles, which uses the rules found with data mining to restrict the portion of the combinatorial library 5 to be tested and does not involve intervention in the processing performed at the optimizer 6; B) selective weighting of the optimization steps in the direction of library areas identified as optimum, in other words, intervention into the search method of the optimizer 6; and C) tuning the selection rules of the black-box optimization methods, which involves direct intervention into the evaluation method of the optimizer 6 or modification of the evaluation variables before they are provided to the optimizer 6. In a preferred embodiment, the forms of intervention A, B and C may be performed in combination. For example, in an optimization step, the interventions can include A and B, B and C, A and C, or A and B and C. The intervention positions and intervention combinations as well as the methods performed in the meta layer module 9 may change from optimization step to optimization step. The interventions also can be performed from subsequent meta layer modules included in the experiment design system.

When optimizing by means of statistical experiment design, the processing performed is similar to that performed by a black-box optimizer. The meta layer module 9 performs an intervention in the optimization process in one or more of the forms described above. For example, prior knowledge is integrated when the influencing variables are selected, such that their field of validity and additional restrictions on the field of validity are included in the combination of influencing variables.

Further information on influencing variables may be included for the sequential statistical designing of experiments by using data mining methods or other methods described above and integrating them into the processing for designing of experiments. For example, the experimental space may be changed on the basis of the additional information after an experiment design processing sequence is performed. The change is performed by adding or removing influencing variables, changing the fields of validity of the individual influencing variables or combined influencing variables, or a combination of the former and latter.

It is particularly advantageous that prior art classic methods for designing experiments can continue to be used at a black-box or statistical optimizer. In accordance with the present invention, these methods for designing experiments are improved by taking into account prior knowledge or knowledge acquired during the experiment sequence, which speeds up the convergence of the methods or actually permits the convergence of the optimization methods per se. In a preferred implementation of the present invention, the convergence speed is considerably increased by tuning according to the invention when, for example, optimizing the design of experiments for catalysts, active ingredients or materials or reaction conditions. A further advantage is that the number of experiments can be reduced while the same results can be expected, thereby making possible a reduced expenditure in terms of time and materials and better utilization of the systems. Another advantage is that integrating prior knowledge prevents loss of research investment when HSE or HTS technologies are used alone or in a combinatorial procedure.

Figure 3:
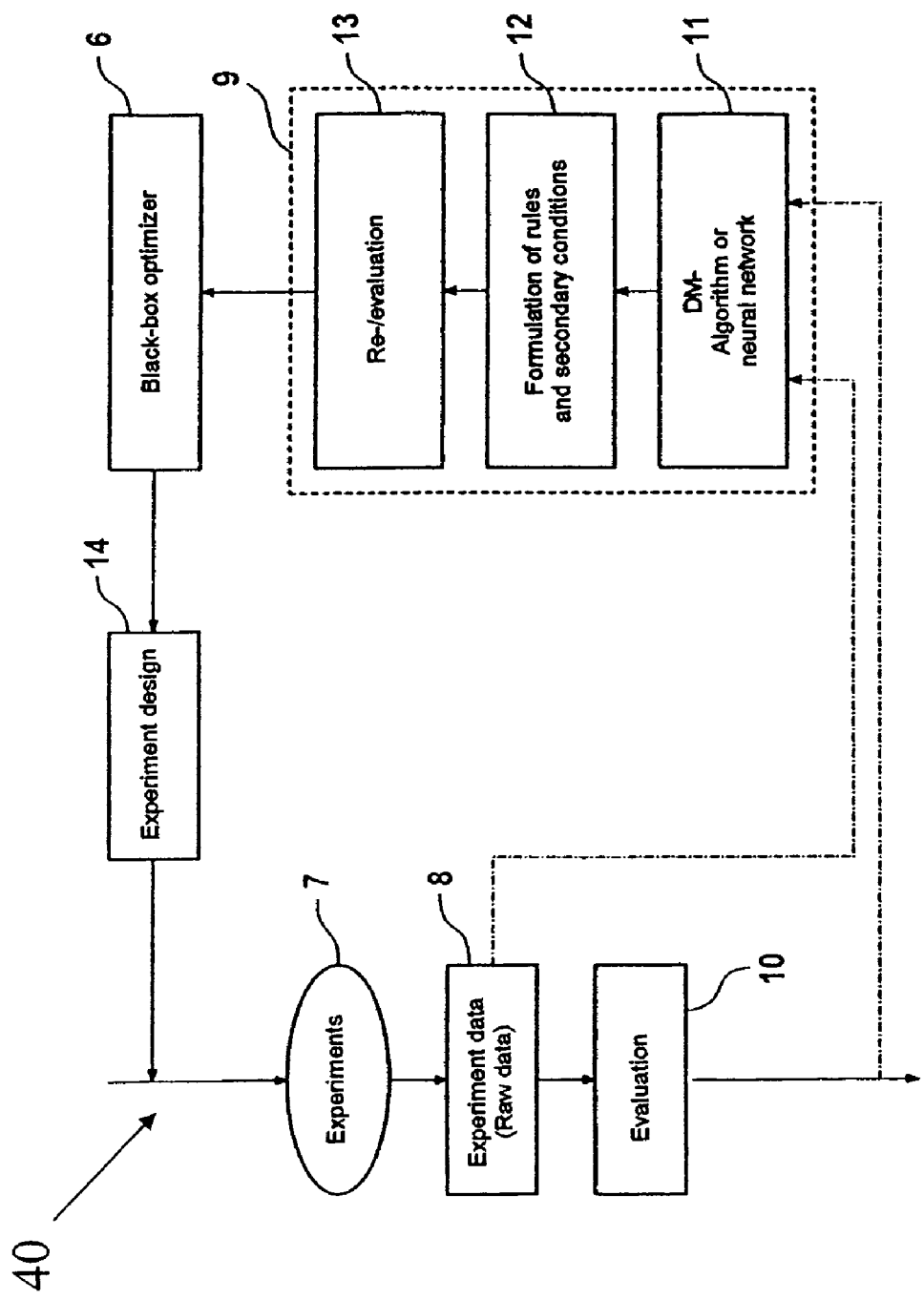
FIG. 3 is a block diagram of an embodiment of a system for designing experiments according to the present invention including re-evaluation of the experiment data.

FIG. 3 shows a system 40 for designing experiments in accordance with an embodiment the present invention including experiment re-evaluation. Referring to FIG. 3, the system 40 includes an experiment set-up module 7 coupled to an experiment data module 8, which in turn is coupled to an evaluation module 10. A meta layer module 9 includes a data analysis module 11 coupled to a rules and conditions module 12, which is coupled to a re-evaluation module 13. The analysis module 11 is coupled to the experiment data module 8 and the evaluation module 10. A black-box optimizer 6 is coupled to the re-evaluation module 13 and an experiment design module 14, which is coupled to the set-up module 7.

The system 40 operates as follows. The experiment set-up module 7 performs one or more experiments previously selected from a combinatorial library (not shown). The module 7 generates experiment data which is output in the form of a data file to the module 8. The experiment data itself may already contain an evaluation if appropriate data is acquired directly by experimental means, such as by the experimental determination of yield which is an evaluation of the experiments performed.

Alternatively, it may be necessary for an evaluation of the experiment data to be additionally performed in the evaluation module 10. For example, the evaluation module 10 performs a calculation rule process to calculate an evaluation based on one or more of the experiment data. The data in the module 8 and, if appropriate, the result of the evaluation by the module 10 are provided to the meta layer module 9. The data analysis module 11 in the module 9 can implement a data mining (DM) algorithm, a neural network, a hybrid method or some other suitable data analysis method. The module 12 generates rules by applying such data analysis methods, for example, additional information and observations relating to the understanding of a chemical system considered in the experiments. The module 11 therefore functions as a rule data generator, and the module 12 formulates corresponding rules and secondary conditions.

The module 13, if appropriate, re-evaluates an experiment or experiments, based on the rules and secondary conditions contained in the module 12. In a preferred embodiment, an experiment is re-evaluated only if a predefined threshold value is exceeded. Alternatively, the user can intervene to activate or deactivate the re-evaluation. The re-evaluation may include assigning a worse evaluation to experiments recognized as being poor and an improved evaluation to experiments recognized as being good. The optimizer 6 processes the data supplied from the module 9, which includes the data file from the module 8, and, if appropriate, re-evaluated experiment data, to create a further experiment design which is then representatively stored as data in the experiment design module 14. The experiment set-up module 7 then performs experiments corresponding to the experiment designs stored in the module 14.

Figure 4:
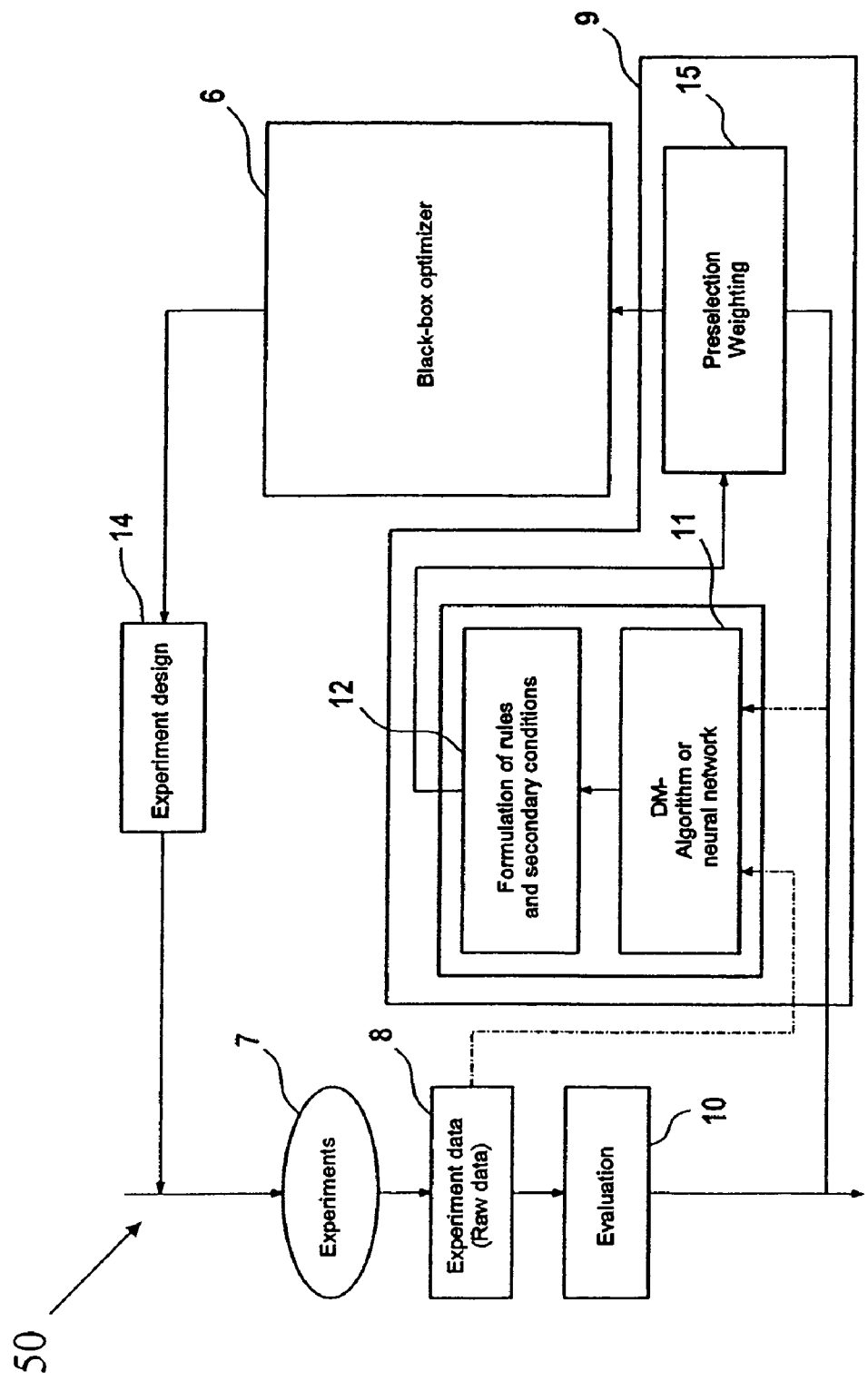
FIG. 4 is a block diagram of an embodiment of a system for designing experiments according to the present invention including pre-selection and weighting of the experiment data.

FIG. 4 shows an alternative embodiment of a system 50 including the feature of filtering data by at least one of pre-selection and weighting. The system 50 for designing experiments has essentially the same component configuration as the system 40, except that the re-evaluation module 13 is replaced by a module 15 for pre-selecting and weighting. Thus the system 50, unlike the system 40, does not re-evaluate the experiment data or evaluate the experiment data in a different manner. Instead, in the system 50, the module 15 operates to eliminate experiments or give them greater or lesser weighting based on the rule conditions stored in the module 12. As a result, a pre-selection is performed without changing the actual evaluation of the experiments.

Figure 5:
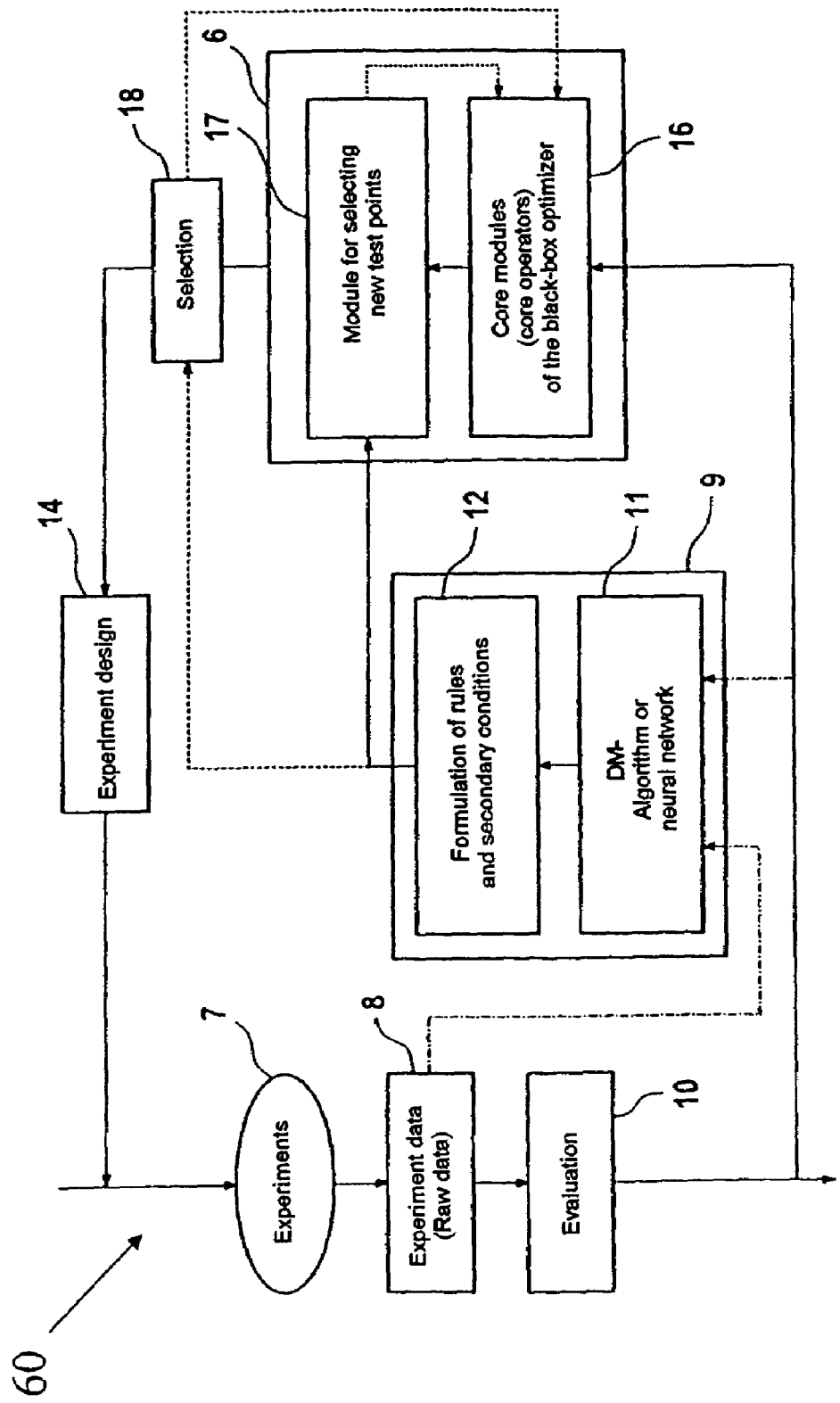
FIG. 5 is a block diagram of an embodiment of a system for designing experiments according to the present invention including influencing the selection of new test points at the optimizer.

FIG. 5 shows a further embodiment of a system 60 according to the present invention. The system 60 is similar to the system 50, except that the system 60 does not include the module 15. In addition, the system 60 provides for direct intervention into the processing operations performed by the optimizer 6. Referring to FIG. 5, the system 60 includes an optimizer 6 containing one or more core operator modules 16 i.e. parts of the program as functions in the algorithms e.g. Selection, calculation of gradients etc.). The module 16 is coupled to the evaluation module 10 and a module 17 for selecting new test points, which is also in the optimizer 6. Further, a post-selection module 18 is coupled to each of the modules 12, 14, 16 and 17.

In operation of the system 60, the rules and secondary conditions formulated by the module 12 influence the processing performed at the module 17. For example, the module 17, based on the rules and secondary conditions data, rejects new test and points that have been selected and that are not performing the rules out of module 12 and provides feedback data to the core module 16. The receipt of the feedback data at the core module 16 causes the core module 16 to select test points as replacements for the rejected test points.

After the core module 16 performs actual optimization, the module 17, based on data received from the module 16, proposes new experiments or test points for optimizing the target variables of the system under consideration. The system can include, for example, a chemical, biotechnological, biological or enzymatic system. The rule generator module 12 in the meta layer module 9, based on the rules data generated at the module 11, eliminates experiments that contradict the rules formulated at the module 12. If appropriate, the core modules 16 of the optimizer 6 generate new, replacement experiments. The experiments can be eliminated completely or partially by applying degrees of weighting. The module 17 then acts on these newly designed experiments to ensure that information which is not, or cannot be, taken into account by the core modules 16 is subsequently integrated into the process of designing of experiments in the core modules 16.

Alternatively, the post-selection module 18 processes data provided by the optimizer 6 and performs post-selection of the new test points selected by the module 17. The module 18, in other words, performs a test to determine whether the new test points generated by the module 17 conform to the rules provided by the module 12. If test points are eliminated in this test, the module 18 provides feedback data to the module 16 to cause the design of alternative new test points.

Figure 6:
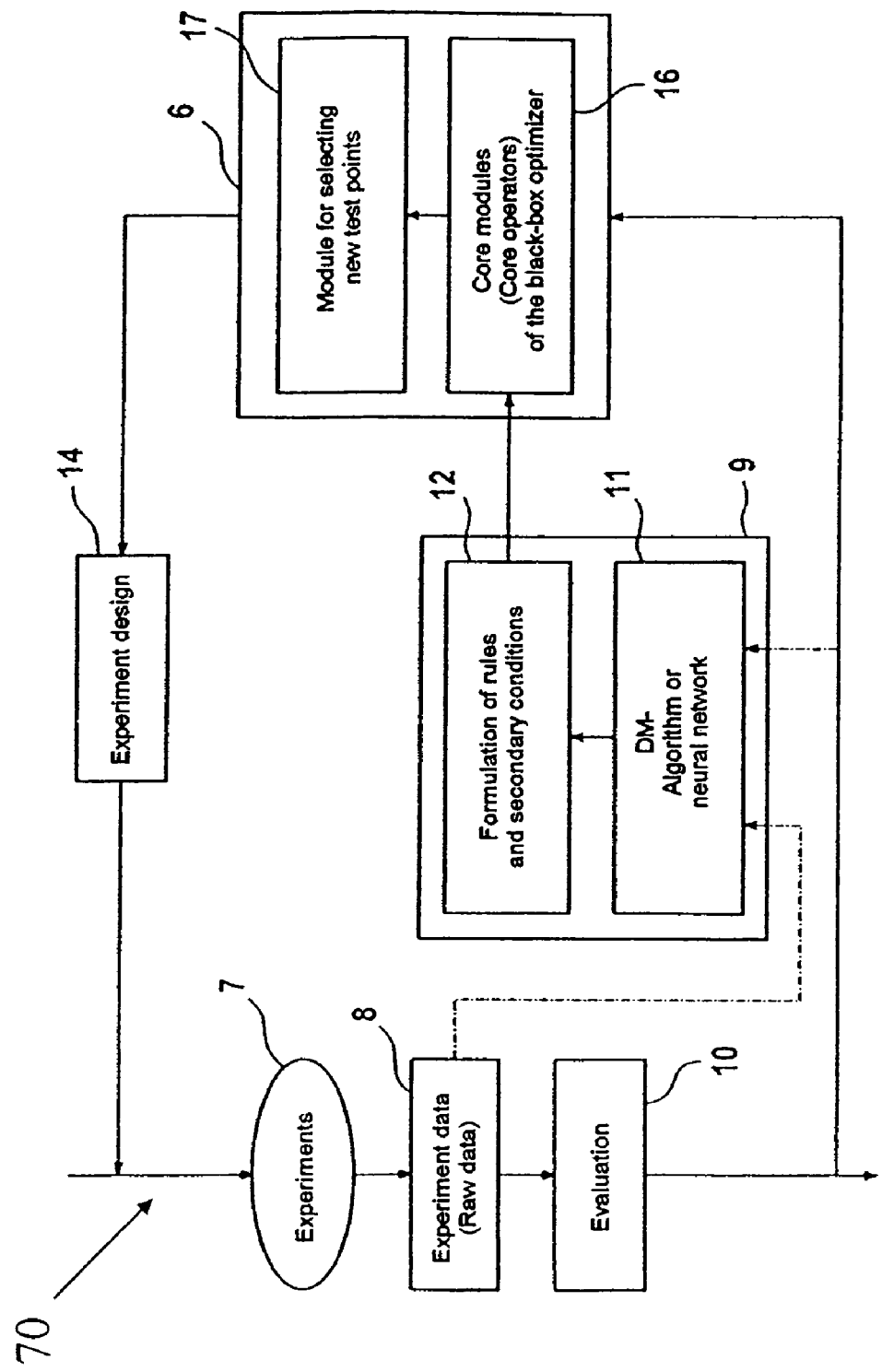
FIG. 6 is a block diagram of an embodiment of a system for designing experiments according to the present invention including influencing a core module of the optimizer.

FIG. 6 is a system 70 for designing experiments in accordance with the present invention which is substantially similar to the system 60, except that the module 18 is absent. Therefore, in the system 70, the method of operation of the module 17 is not influenced by post-selection processing and, further, the method of operation of the core module 16 of the optimizer 6 is influenced directly. In preferred embodiments, core operators of neural networks include and consider in the processing the type and number of influencing variables and the weighting of individual data points. In addition, core operators of evolutionary algorithms, such as the genetic algorithm, include a selection operator which provides for selection of a new series of experiments, the mutation operator and the cross-over operator.

In operation of the system 70, the processing at the optimizer 6 accounts for the rules and information generated at the rule generator module 12. In a preferred embodiment including optimizers coupled to neural networks, the processing is based on the rules and operates to restrict the experimental space, or the processing weights the data records in a particular way.

For evolutionary algorithm optimizers, the core operators account for the additional information. In a preferred embodiment, specific cross-overs, selections or mutations are prohibited or performed with preference. For both types of optimizers, intervention into the processing portions of the optimizer, by way of interfaces or including information in the optimizer processing by means of manual or program-controlled changes of optimization parameters, results in complete automation of the workflow.

In a preferred embodiment, the features of the systems 40 and 70 can be combined with one another such that a plurality of rule generator modules, in other words, a plurality of meta layer modules, are integrated into the optimization sequence independently of one another. The rules generator modules generate the rules using various methods, where the methods preferably are independent of one another, and the generated rules are combined in the module 12. The rules formulated by the rule generator module of the meta layer module 9 are taken into account either automatically by way of defined interfaces and with compliance with predefined threshold values, or by means of manual formulation of rules for this part of the optimizer into which the rule generator intervenes.

Although preferred embodiments of the present invention have been described and illustrated, it will be apparent to those skilled in the art that various modifications may be made without departing from the principles of the invention.

The invention claimed is:

1. A method for designing experiments comprising the steps of:
    a) selecting at least a first experiment, previously performed, from an experimental space including a plurality of experiments using a data-driven optimizer;
    b) inputting to at least one meta layer module experimentally determined experiment result data of the first experiment generated in the experimental space, wherein the experimentally determined experiment result data of the first experiment comprises knowledge obtained while the experiment is performed;
    c) evaluating the experimentally determined experiment result data of the first experiment at the meta layer module, wherein the meta layer module generates evaluation data based on the evaluating of the experimentally determined experiment result data; and wherein the evaluation data includes rules generated by performing data analysis on the experimentally determined experiment result data;
    d) processing the experimentally determined experiment result data of the first experiment at the optimizer, wherein the processing at the optimizer is influenced by the evaluation data which comprises rules and wherein the optimizer generates experiment design data based on the processing of the experimentally determined experiment result data; and
    e) outputting an experiment design based on the experiment design data generated using the experimentally determined experiment result data from the first experiment.

2. The method of claim 1 further comprising the steps of:
    f) inputting an optimization goal;
    g) selecting at least a second experiment from the experimental space using the optimizer;
    h) performing step b) to step d) for experimentally determined experiment result data of the second experiment; and
    i) continuing to perform steps g) and h) until the optimization goal is reached.

3. The method of claim 2, wherein at least one of the optimizer and the meta layer module changes the experimental space before the selecting the at least second experiment step.

4. The method of claim 1, wherein the meta layer module contains at least one of a neural network module, a hybrid model module, a rigorous model module and a data mining module used as the data analysis to generate the rules.

5. The method of claim 1, wherein the experiment result data is based on experiments from at least one of active ingredient research, materials research, catalysis research, biotechnology and optimization of reaction conditions.

6. The method of claim 1, wherein the evaluating at the meta layer module to generate the evaluation data includes the step of filtering the experiment result data.

7. The method of claim 6, wherein the filtering includes re-evaluating the experiment result data.

8. The method of claim 6, wherein the filtering includes at least one of weighting and pre-selecting the experiment result data.

9. The method of claim 8, wherein the weighting includes at least one of using a weighting parameter and performing at least one duplication of the experiment result data.

10. The method of claim 1, wherein the optimizer includes at least one core module and one module for selecting new test points.

11. The method of claim 10, wherein the processing at the optimizer is influenced based on processing at the module for selecting the new test points.

12. The method of claim 11, wherein the processing at the module for selecting the new test points is influenced by at least one of a value exceeding a threshold and a predefined user value.

13. The method of claim 10, wherein the processing at the optimizer is influenced based on processing at the core module.

14. The method of claim 13, wherein processing at the core module is influenced by at least one of a value exceeding a threshold and a predefined user value.

15. A system for designing experiments comprising:
    an experimental space module including a plurality of experiments;
    an experimental data module including experimentally determined experiment result data for at least one of the experiments in the experimental space module;
    a optimizer for selecting at least one first experiment, previously performed, from the experimental space module;
    a meta layer module coupled to the optimizer for receiving experimentally determined experiment result data of the first experiment from the experiment data module;
    wherein the meta layer module receives as input experimentally determined experiment result data of the first experiment from the experimental data module, wherein the experimentally determined experiment result data of the first experiment comprises knowledge obtained while the experiment is performed;

wherein the meta layer module evaluates the experimentally determined experiment result data and generates evaluation data based on the evaluation of the experimentally determined experiment result data; and wherein the evaluation data includes rules generated by performing data analysis on the experimentally determined experiment result data;

wherein the optimizer processes the experimentally determined experiment result data of the first experiment and generates experiment design data based on the processing of the experimentally determined experiment result data of the first experiment, wherein the processing by the optimizer is influenced by the evaluation data; and wherein the optimizer outputs to the experimental space module an experiment design based on the experiment design data generated using the experimentally determined experiment result data from the first experiment.

16. The system of claim 15, wherein the meta layer module includes at least one of a neural network module, a hybrid model module, a rigorous model module and a data mining module used as the data analysis to generate the rules.

17. The system of claim 15, where the meta layer module includes a filtering module for filtering the experiment result data.

18. The system of claim 17, wherein the filtering module is operable to re-evaluate the experiment result data.

19. The system of claim 17, wherein the filtering module is operable to perform at least one of weighting and pre-selecting the experimental result data.

20. The system of claim 15, wherein the optimizer includes at least one core module and a module for selecting new test points.

21. The system of claim 20, wherein the meta layer module is operable to influence the module for selecting the new test points.

22. The system of claim 20, wherein the meta layer module is operable to influence the core module.

23. The system of claim 15, wherein the system is for achieving an optimization goal, and wherein, until the optimization goal is reached as determined by the optimizer or the meta layer module, (a) the optimizer selects at least one second experiment from the experimental space module;

(b) the metal layer module receives experimentally determined experiment result data of the second experiment from the experiment data module, evaluates the experimentally determined experiment result data on the second experiment and generates evaluation data based on the evaluation of the experimentally determined experiment result data of the second experiment; and (c) the optimizer processes the experimentally determined experiment result data of the second experiment and generates experiment design data based on the processing of the experimentally determined experiment result data of the second experiment, wherein the processing by the optimizer is influenced by the evaluation data generated from the experimentally determined experiment result data of the first and second experiments.

* * * * *